United States Patent
Biasi da Silva et al.

(10) Patent No.: US 10,507,713 B2
(45) Date of Patent: Dec. 17, 2019

(54) WIND DEFLECTOR ASSEMBLY FOR VEHICLE ROOF

(71) Applicant: MAGNA MIRRORS OF AMERICA, INC., Holland, MI (US)

(72) Inventors: Daniel Biasi da Silva, Campinas (BR); Josemar de Melo Dornelas, Valinhos (BR); Renato Ramos Jannuzzi, Indaiatuba (BR)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 15/933,409

(22) Filed: Mar. 23, 2018

(65) Prior Publication Data

US 2018/0272848 A1 Sep. 27, 2018

Related U.S. Application Data

(60) Provisional application No. 62/475,508, filed on Mar. 23, 2017.

(51) Int. Cl.
*B60J 7/22* (2006.01)

(52) U.S. Cl.
CPC ............ *B60J 7/22* (2013.01); *B60J 7/223* (2013.01)

(58) Field of Classification Search
CPC .................................. B60J 7/22; B60J 7/223
USPC ........................................................ 296/217
See application file for complete search history.

(56) References Cited

U.S. PATENT DOCUMENTS

| | | | |
|---|---|---|---|
| 4,920,698 A | 5/1990 | Friese et al. | |
| 4,995,195 A | 2/1991 | Olberding et al. | |
| 5,052,746 A * | 10/1991 | Reihl | B60J 7/22 296/217 |
| 5,146,712 A | 9/1992 | Hlavaty | |
| 5,531,046 A | 7/1996 | Kollar et al. | |
| 5,551,197 A | 9/1996 | Repp et al. | |
| 5,572,376 A | 11/1996 | Pace | |
| 5,853,895 A | 12/1998 | Lewno | |
| 6,119,401 A | 9/2000 | Lin et al. | |
| 6,174,025 B1 * | 1/2001 | Henderson, III | B60J 7/22 296/217 |
| 6,666,503 B1 * | 12/2003 | Sorensen | B60J 7/22 296/217 |
| 6,866,336 B2 * | 3/2005 | De Gaillard | B60J 7/22 296/217 |
| 6,955,009 B2 | 10/2005 | Rasmussen | |
| 7,073,293 B2 | 7/2006 | Galer | |
| 9,475,370 B2 | 10/2016 | Snider et al. | |

(Continued)

Primary Examiner — Dennis H Pedder
(74) Attorney, Agent, or Firm — Honigman LLP

(57) ABSTRACT

A wind deflector assembly for a roof of a vehicle, with the vehicle roof including a sunroof that is openable and closable relative to an aperture in the vehicle roof, includes a wind deflector having a frame and a screen. A pair of tracks is disposed at an inner surface of the vehicle roof at or near the aperture. The wind deflector is movably and pivotally mounted at the tracks via a pair of mounting arms. The mounting arms are movable along the tracks and pivot to pivot the frame and the wind deflector between a retracted position, where the wind deflector is disposed at the inner surface of the vehicle roof and between the tracks, and an extended position, where the wind deflector is disposed partially at the opening and is pivoted upward so as to protrude above an outer surface of the vehicle roof.

16 Claims, 15 Drawing Sheets

(56) References Cited

U.S. PATENT DOCUMENTS

2004/0020131 A1  2/2004  Galer et al.
2008/0106124 A1  5/2008  Snider
2008/0127563 A1  6/2008  Tooker

* cited by examiner

WIND DEFLECTOR ASSEMBLY FOR VEHICLE ROOF

CROSS REFERENCE TO RELATED APPLICATION

The present application claims the filing benefits of U.S. provisional application Ser. No. 62/475,508, filed Mar. 23, 2017, which is hereby incorporated herein by reference in its entirety.

FIELD OF THE INVENTION

The present invention relates to a wind deflector for a vehicle roof, such as a vehicle roof with a movable or openable/closable sunroof window assembly.

BACKGROUND OF THE INVENTION

It is known to provide an openable/closable sunroof window assembly for an opening in a roof of a vehicle, and such window assemblies may include a movable or slidable window panel is supported by rails and may be moved along the rails to open and close the window. When the sunroof is opened, it is desirable to limit air flow through the opening and into the vehicle.

SUMMARY OF THE INVENTION

The present invention provides a wind deflector assembly for a glass roof of a vehicle that functions to deflect wind from entering an opening in the roof when a sunroof window of the roof is opened. The wind deflector assembly comprises a wind deflector or screen or panel that is movable and pivotable between a non-use position, where the deflector or screen is disposed along an inner surface of the vehicle roof and retracted away from the opening, and a use or deflecting position, where the deflector or screen is moved toward and partially into the opening of the roof and is pivoted upward so as to extend partially through the opening and above the vehicle roof at the opening.

These and other objects, advantages, purposes and features of the present invention will become apparent upon review of the following specification in conjunction with the drawings.

DESCRIPTION OF THE PREFERRED EMBODIMENTS

Figure 1:
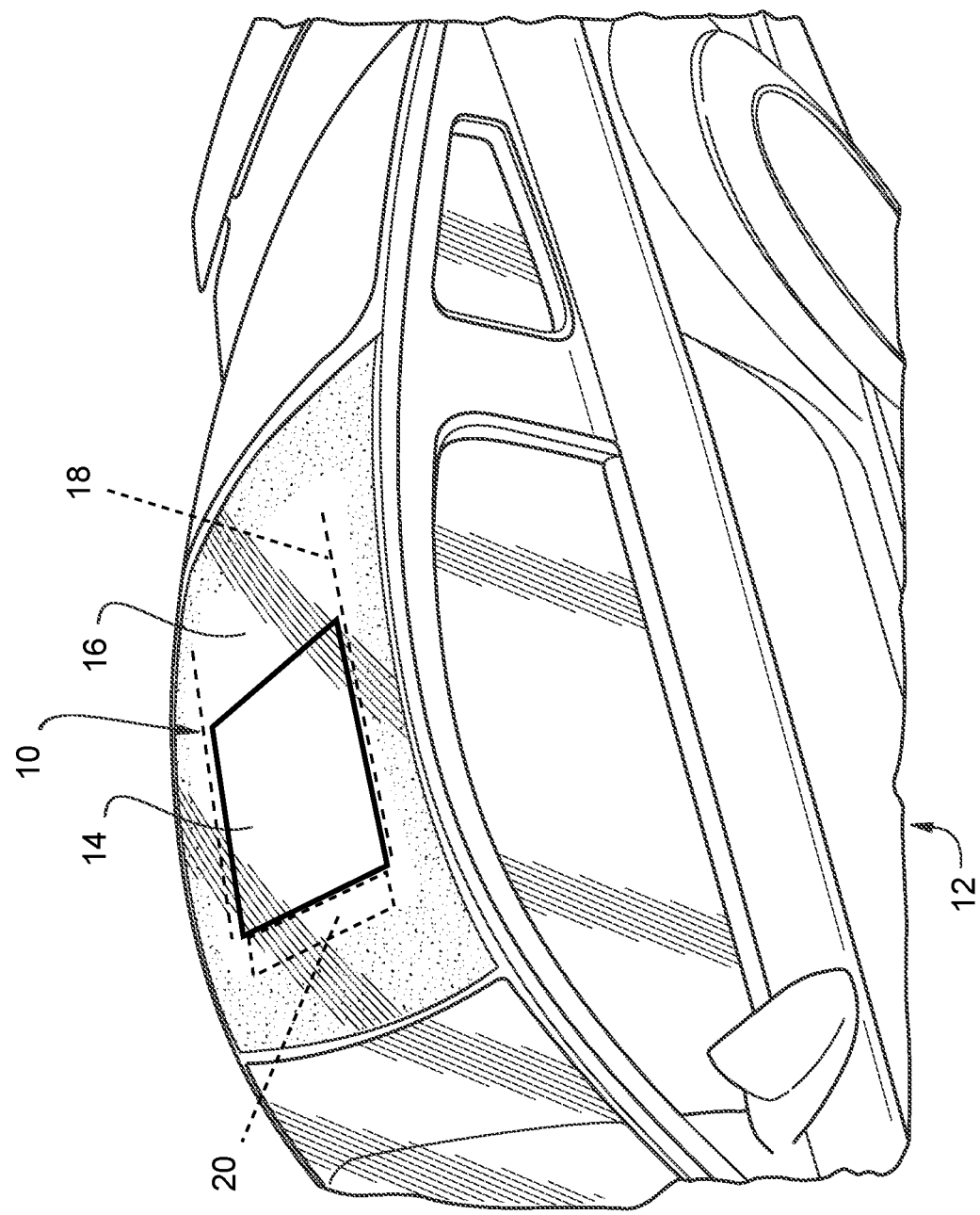
FIG. 1 is a perspective view of a vehicle having a wind deflector assembly for a sunroof window in accordance with the present invention.

Referring now to the drawings and the illustrative embodiments depicted therein, a sunroof window assembly 10 of a vehicle 12 (FIG. 1) includes a movable glass window panel 14 that is movable relative to a fixed roof or glass panel 16 of the vehicle 12 between an opened position (where the movable panel 14 is moved at least partially away from an aperture formed or established through said fixed glass roof panel 16) and a closed position (where the movable panel is moved to be generally within the aperture with its outer surface generally flush with the outer surface of the fixed glass panel 16). The movable window panel is movable along a pair of side channels or rails 18 relative to the fixed roof. A wind deflector assembly 20 is disposed at the forward or leading edge of the glass roof that surrounds and defines the opening. The wind deflector assembly 20 comprises a wind deflector panel or screen element 22 that is mounted at a pair of mounting arms 24 that movably and pivotally mount the wind deflector 22 at respective tracks or runners 26 mounted at the underside of the leading edge region of the glass roof 16, as discussed below.

Figure 2:
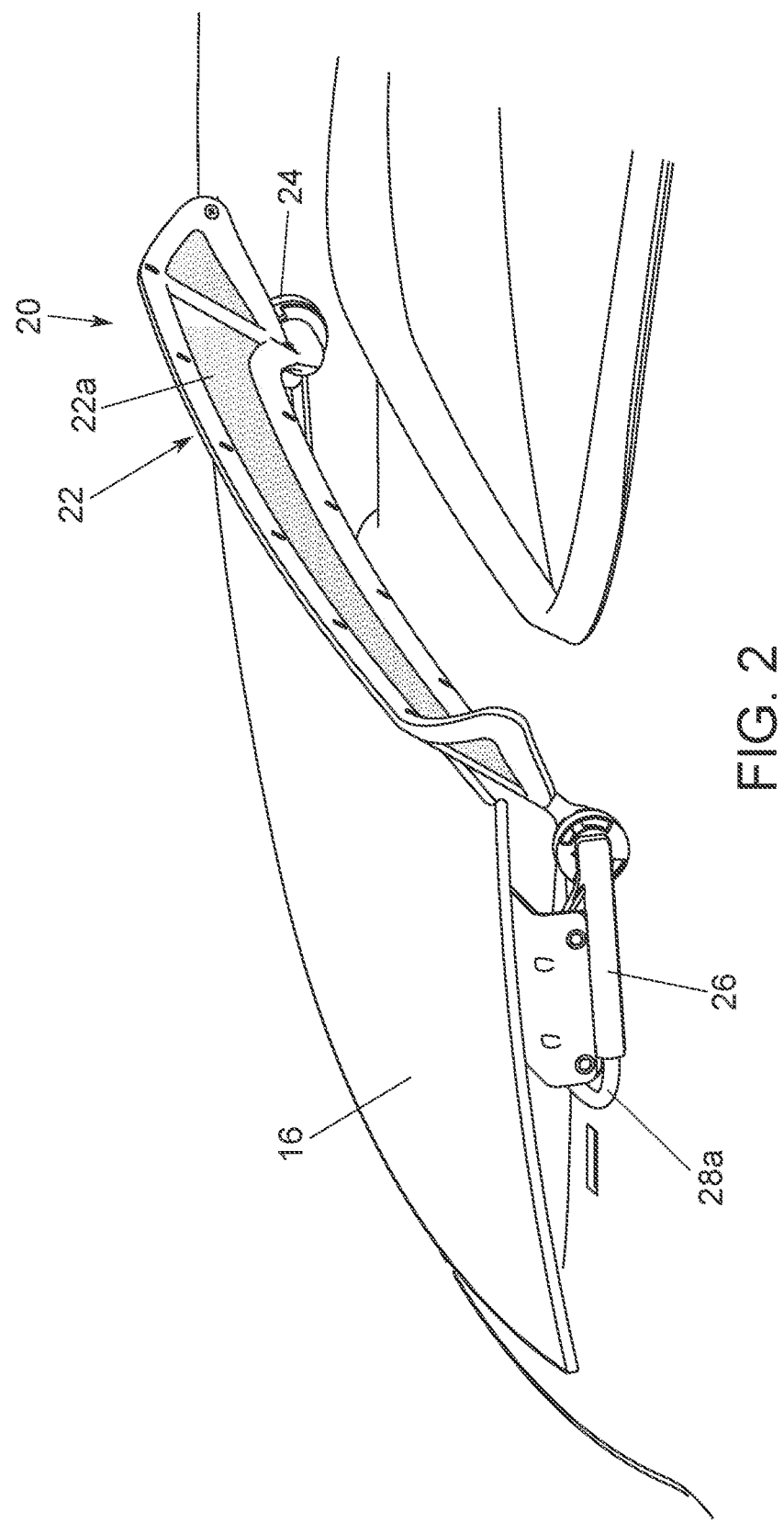
FIG. 2 is a perspective view and partial sectional view of the vehicle roof and wind deflector assembly of the present invention.
Figure 3:
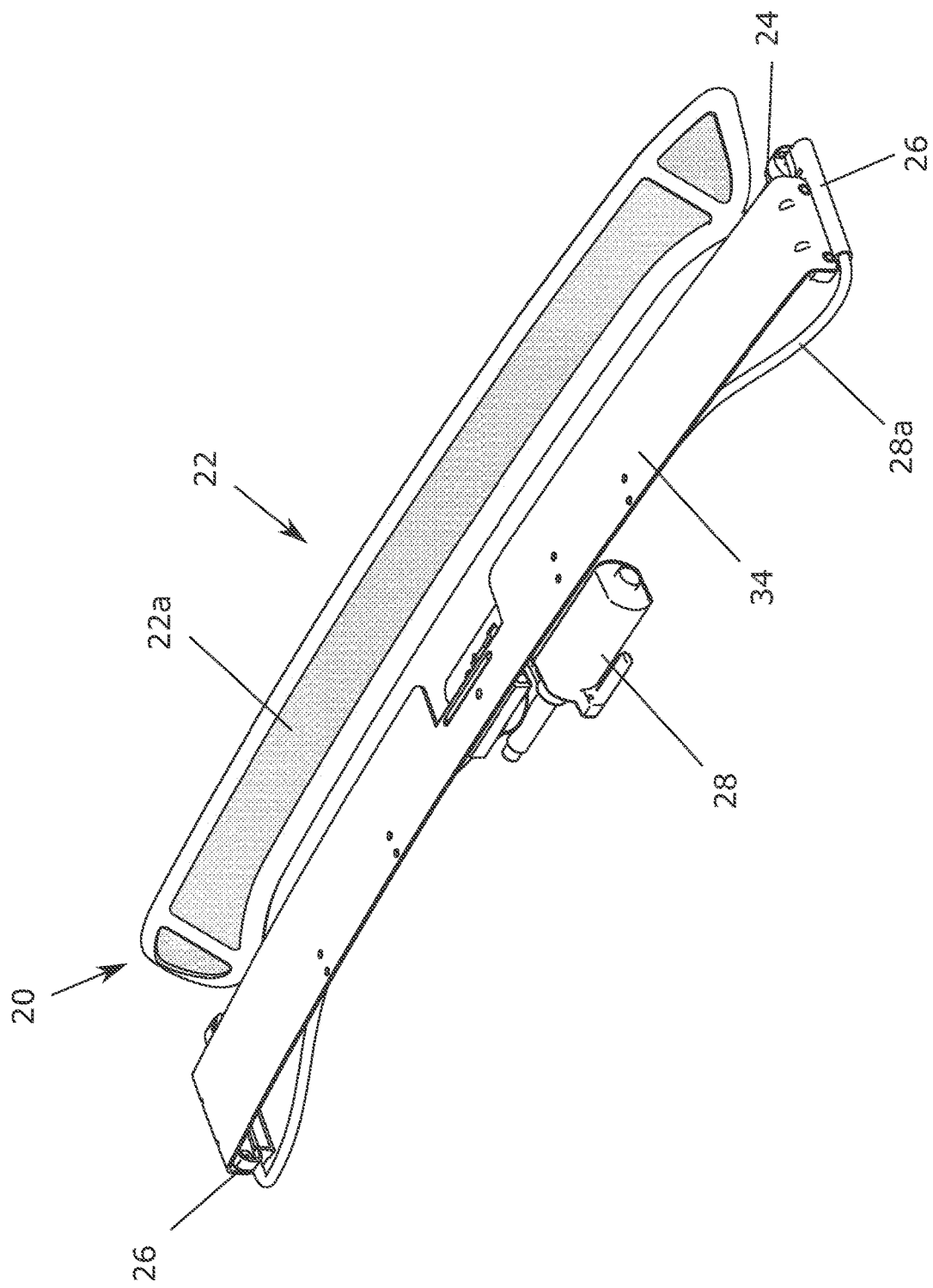
FIG. 3 is a perspective view of the wind deflector assembly of the present invention.
Figure 4:
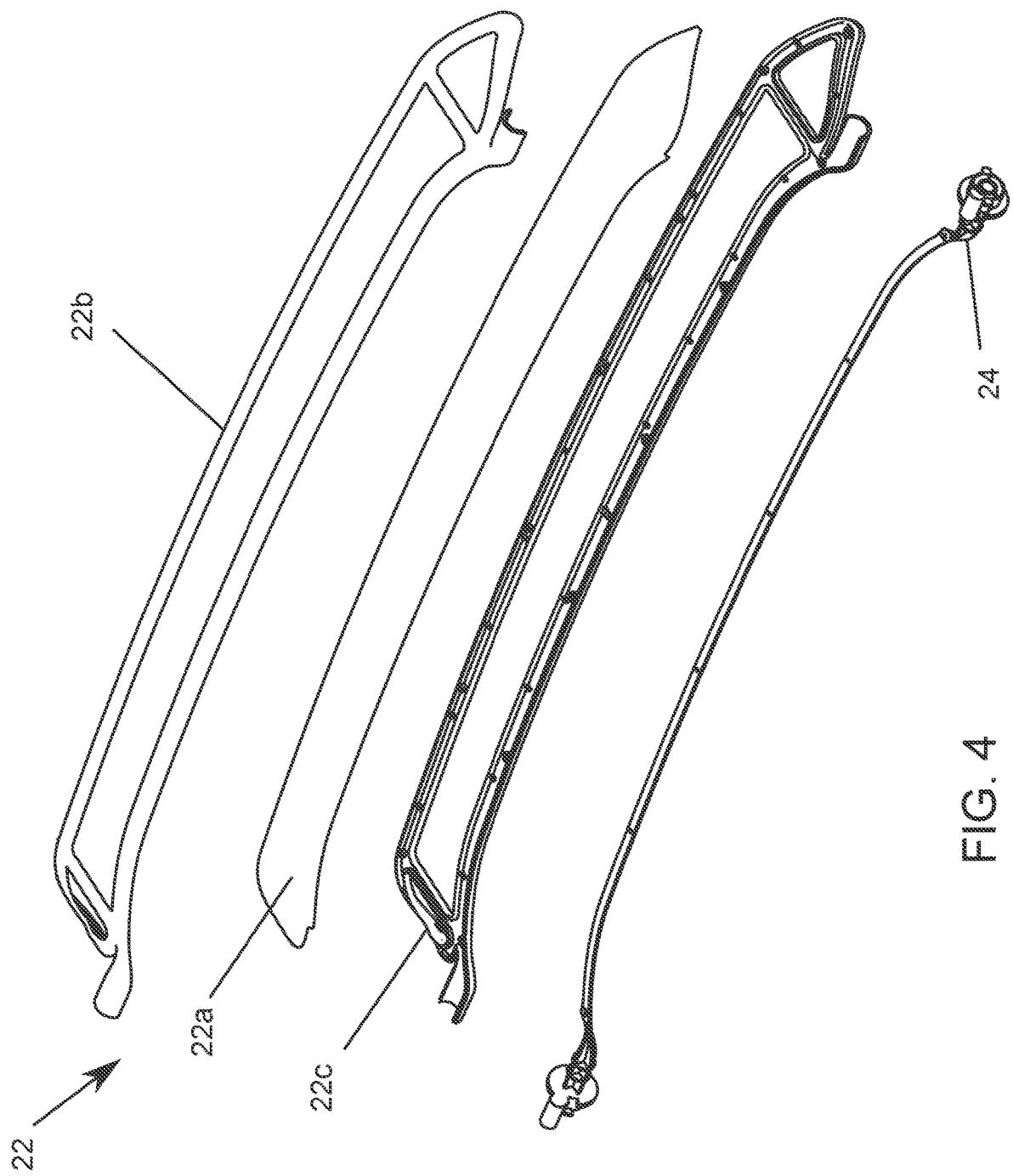
FIG. 4 is an exploded perspective view of the wind deflector and mounting arms of the wind deflector assembly.

As shown in FIGS. 2 and 3, the wind deflector assembly 20 includes a drive motor 28 that drives cables 28a (one cable at each side) to move the respective mounting arms 24 and wind deflector 22 along the tracks or runners 26, such as by causing each of the cables to pull in one direction to retract the wind deflector and causing each of the cables to push in the other direction to extend and raise the wind deflector (optionally, the system may have two cables at each side such that one of the cables pulls in one direction to retract the wind deflector and the other of the cables pulls in the other direction to extend and raise the wind deflector). For example, the drive motor may drive a drive element to rotate in one direction to cause the cables to move the mounting arms in one direction along the tracks and may drive the drive element to rotate in an opposite direction to cause the cables to move the mounting arms in the opposite direction along the tracks. The wind deflector 22 may comprise any suitable wind deflecting element, such as a fabric or screen element 22a (that allows wind or air to flow through but defects some of the air flow to limit air flow into the vehicle when the sun roof is open) that is disposed or sandwiched between frame portions 22b, 22c, with the sides or ends of the frame portions attaching to arm portions 24a of respective ones of the arms 24, which move and pivot relative to the tracks 26 responsive to the drive motor.

Figure 5:
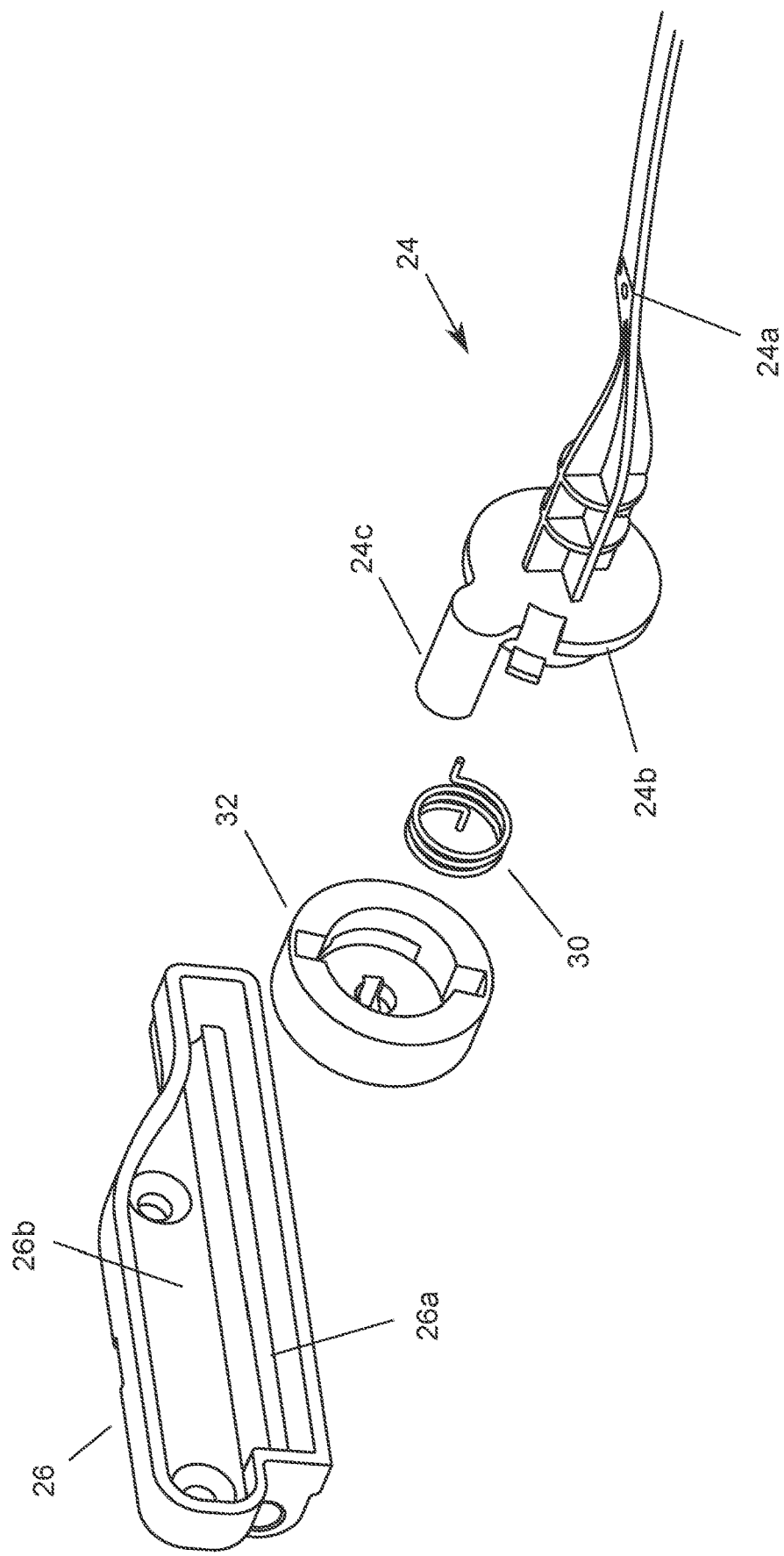
FIG. 5 is an exploded perspective view of the mounting arm and track or runner of the wind deflector assembly.

As shown in FIG. 5, each mounting arm 24 includes the arm portion 24a and a base portion 24b, which comprises a generally cylindrical base portion with a tab or stop element 24c protruding from the base portion 24b. A biasing element or torsional spring 30 is disposed between the base portion 24b and a runner guide 32 so as to rotatably bias or urge the mounting arm 24 toward an angled orientation. The runner guide 32 is configured to move linearly along an inner channel 26a of the respective track 26 via pulling or pushing in either direction by a respective cable of the drive motor or system 28. The tracks and motor drive system may mount to or attach at a frame or support member 34 (FIG. 3), which is mountable or attachable at the vehicle roof or to another support structure of the vehicle to mount the wind deflector assembly at the vehicle.

Figure 6:
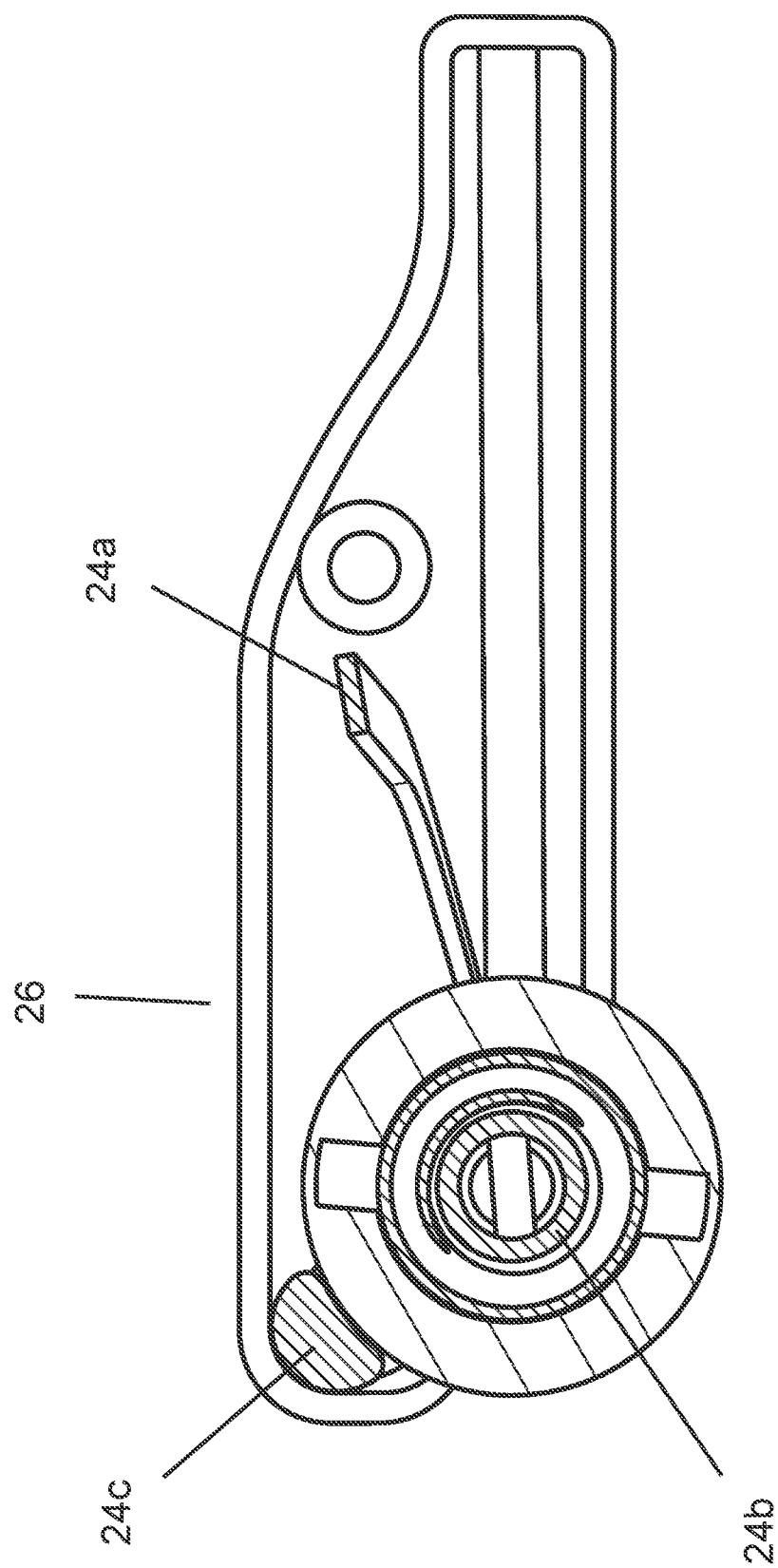
FIGS. 6-8 are side views of the wind deflector assembly, showing the fully closed state, partially open state and fully open state.
Figure 7:
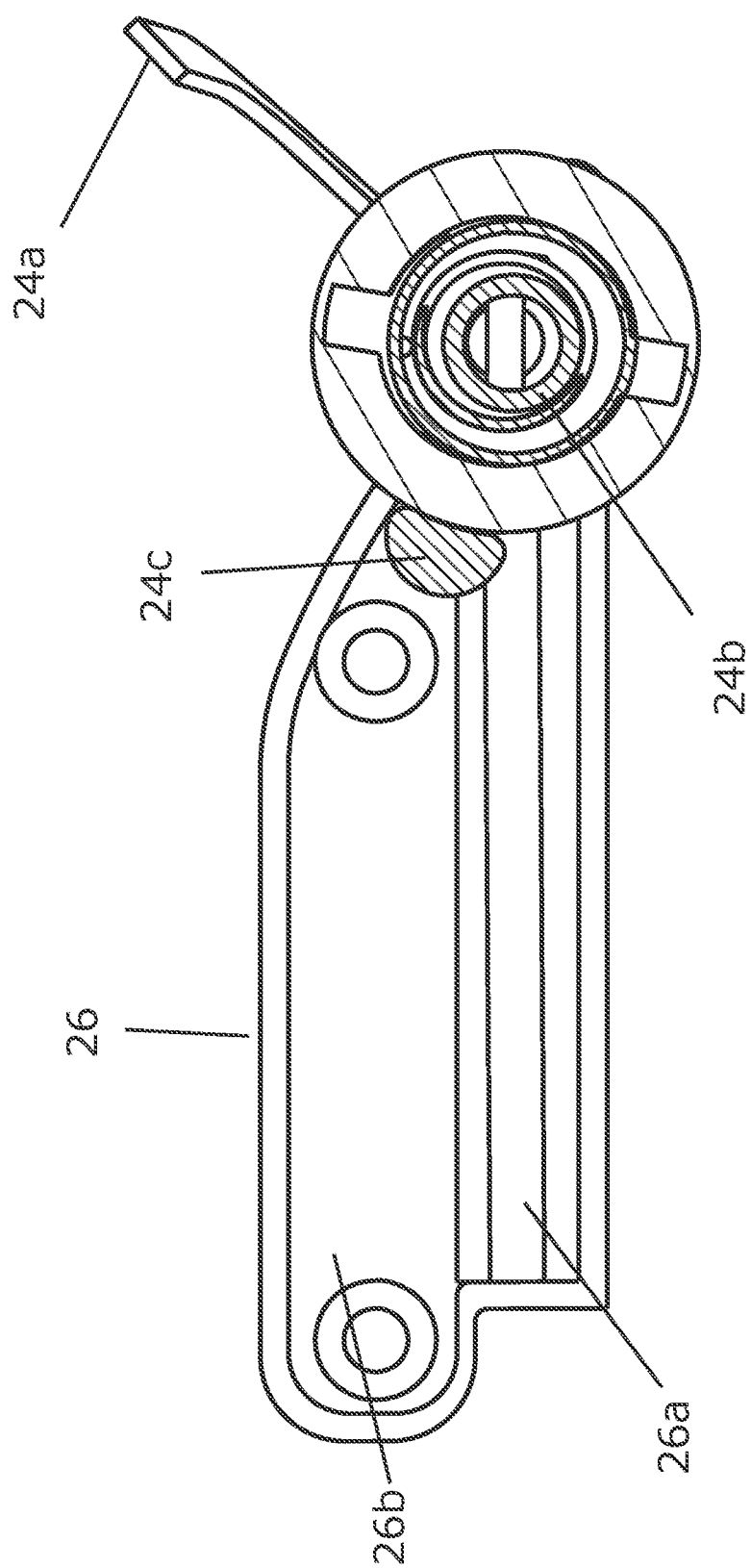
Figure 8:
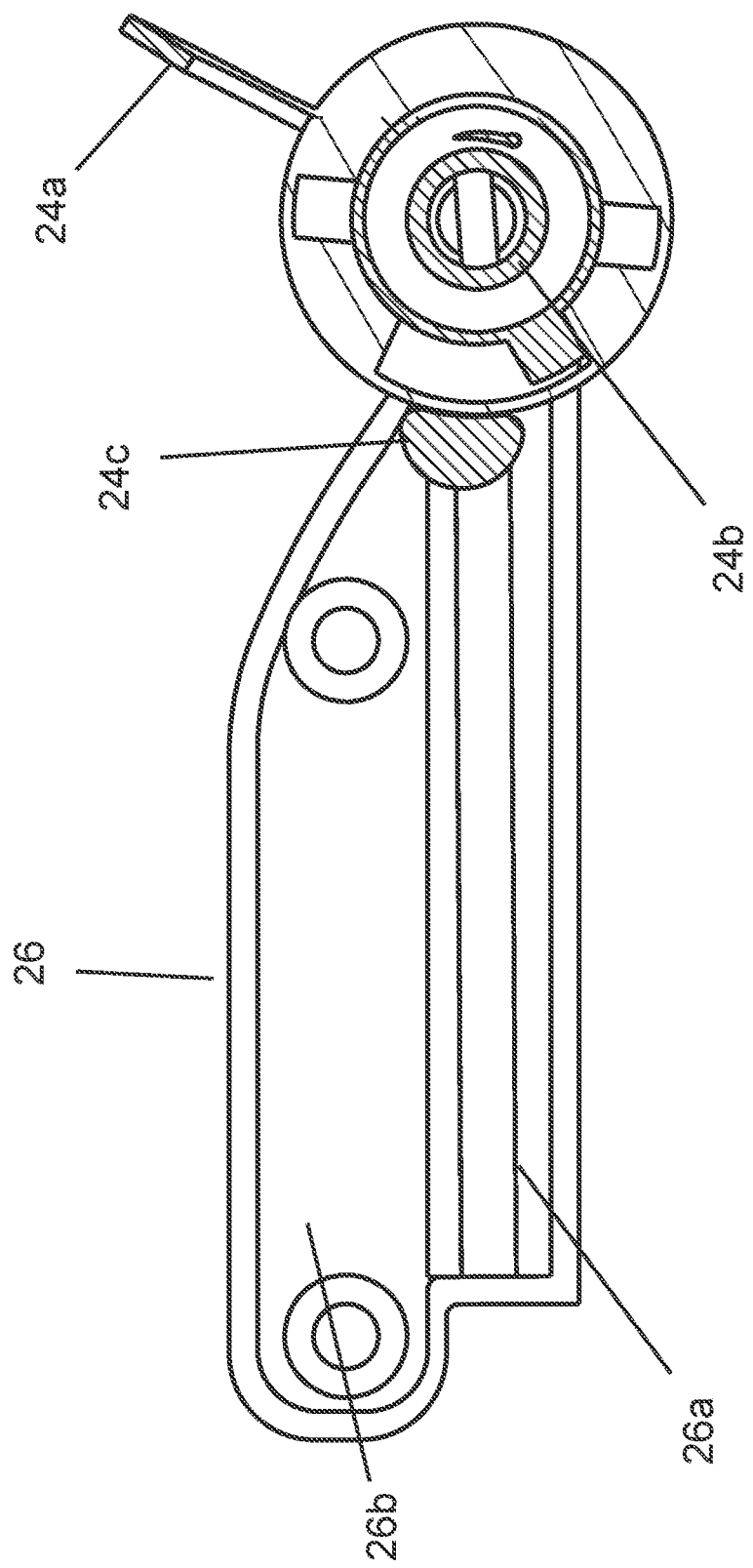
Figure 9:
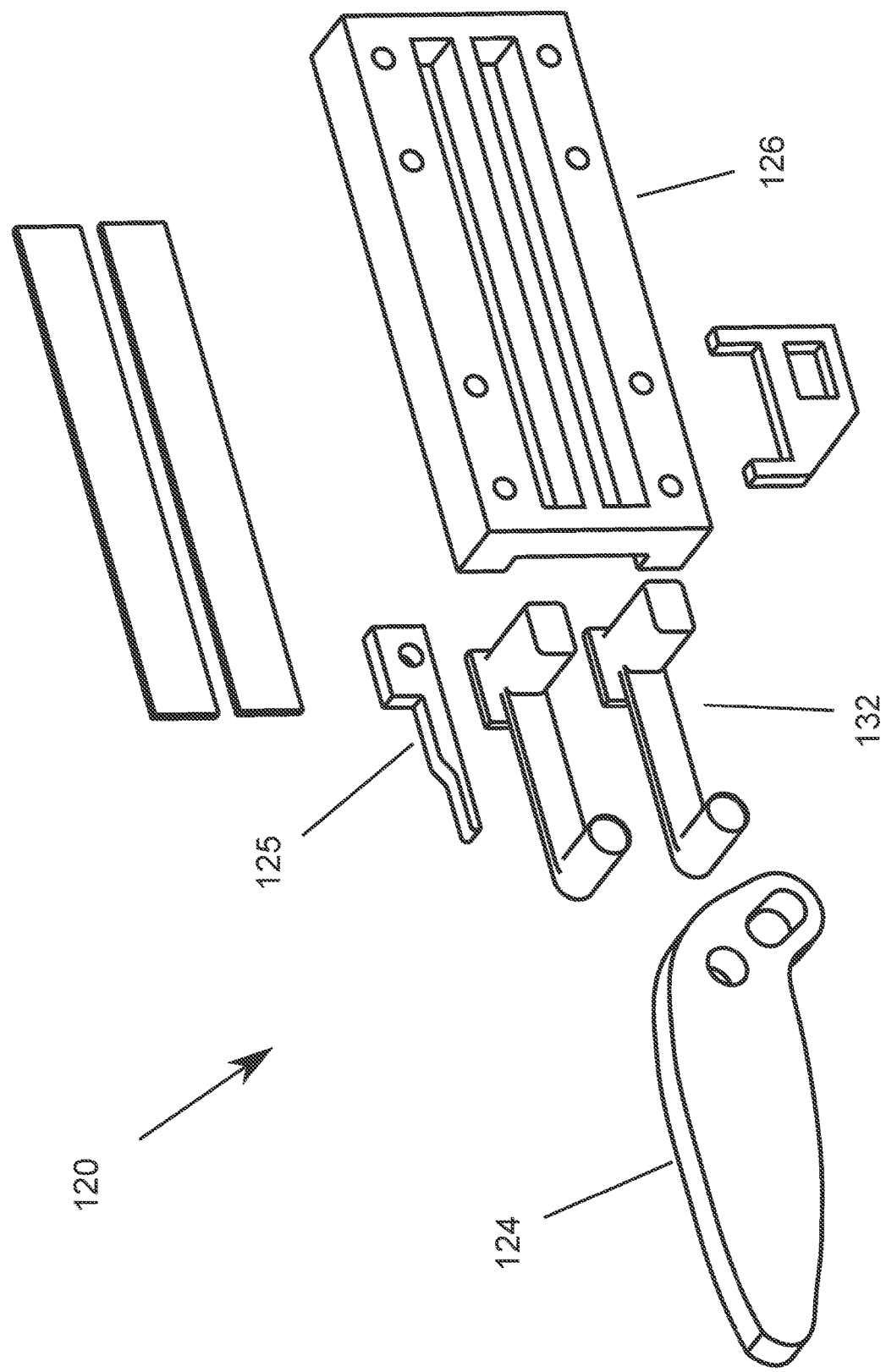
FIG. 9 is an exploded perspective view of another wind deflector assembly suitable for use at a sunroof opening in a vehicle roof.
Figure 10:
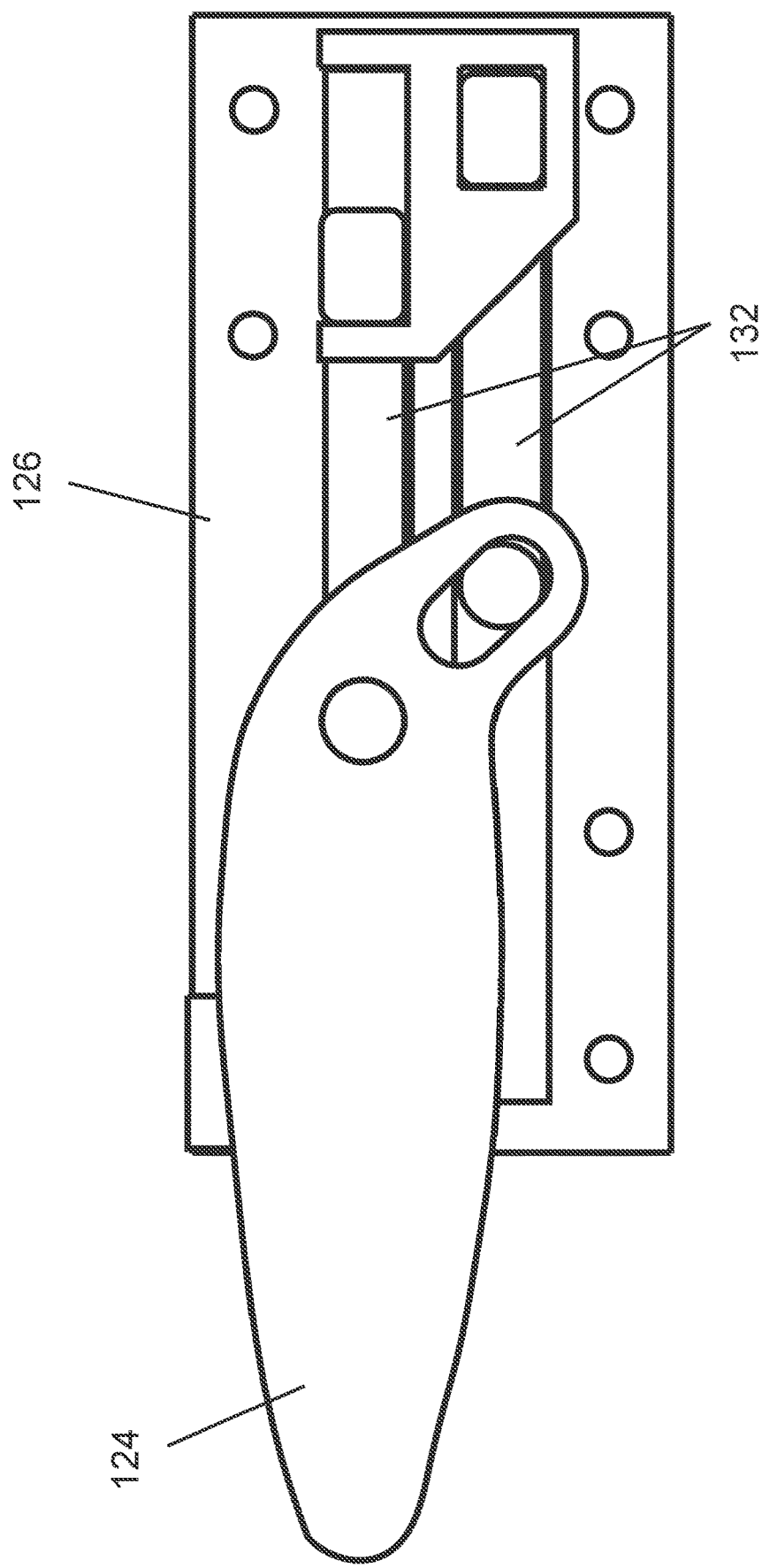
FIGS. 10-12 are side views of the wind deflector assembly of FIG. 9, showing the fully closed state, partially open state and fully open state.
Figure 11:
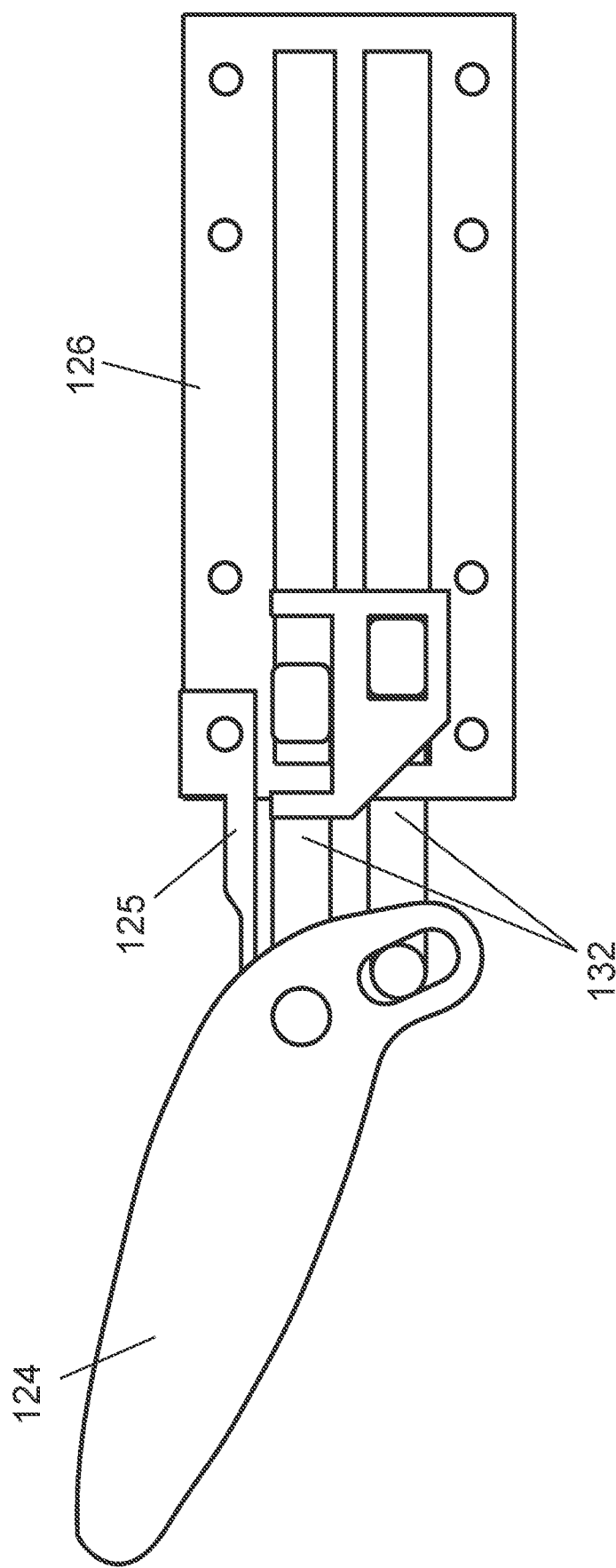

Thus, and as can be seen with reference to FIGS. 6-8, when the wind deflector is retracted (FIG. 6), the mounting arm 24 is oriented such that the arm portion 24*a* is disposed along or generally parallel to the track 26, with the base portion 24*b* disposed in a wider portion of the track to accommodate the base portion 24*b* and tab 24*c*. As the mounting arm is moved along the track the shape of the outer channel 26*b* (which narrows toward the rearward end of the track) of the track 26 causes the base portion to pivot by urging or guiding the tab 24*c* downward, which causes the mounting arm to pivot (such as in the counter-clockwise direction in FIG. 7) upward as the arm portion 24*a* extends from the track and the tab 24*c* moves along the curved upper portion of the channel 26*b* of the track. When fully extended, the arm portion 24*a* extends upward and rearward as shown in FIG. 8. When in the fully extended state, downward pivoting of the wind deflector (such as due to wind forces acting against the deflector as the vehicle is driven along a road) is limited by the tab 24*c* engaging the upper wall of the outer channel 26*b* of the track. When the wind deflector is to be retracted, the motor pulls the cable in the opposite direction to pull the runner guide 32 toward the opposite end of the track, which causes pivoting of the wind deflector back to the initial state of FIG. 6.

Thus, the wind deflector of the present invention provides for translational movement of the base portion along the track, whereby the form of the track or guide surface and the shape or configuration of the base portion cooperate to cause pivotal movement of the base portion and wind deflector relative to the tracks. Thus, the wind deflector may comprise a simpler drive mechanism that only provides for generally translational movement along a track, with the track and arms being configured to provide the required or desired pivotal movement of the wind deflector between the extended and retracted positions.

Figure 12:
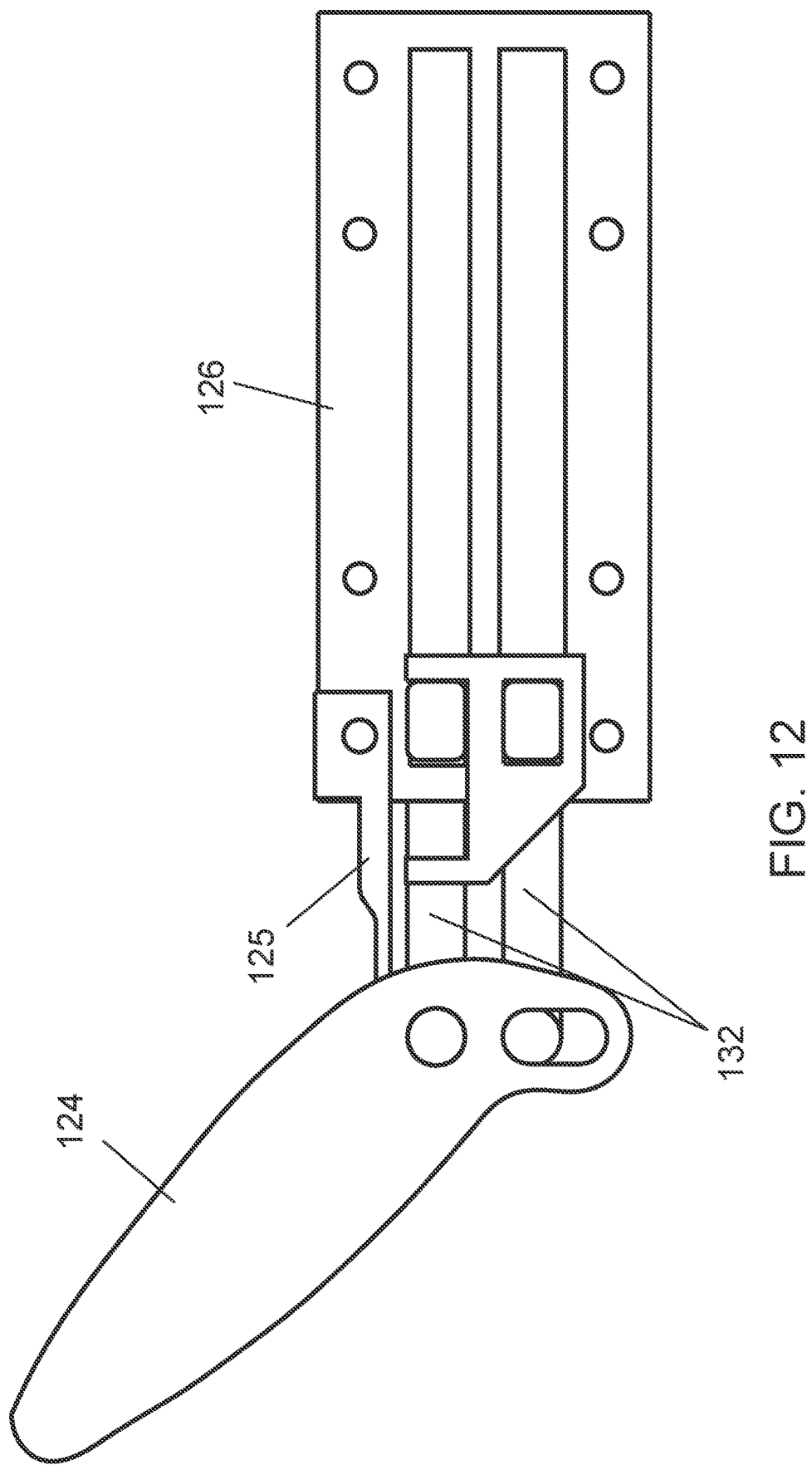
Figure 13:
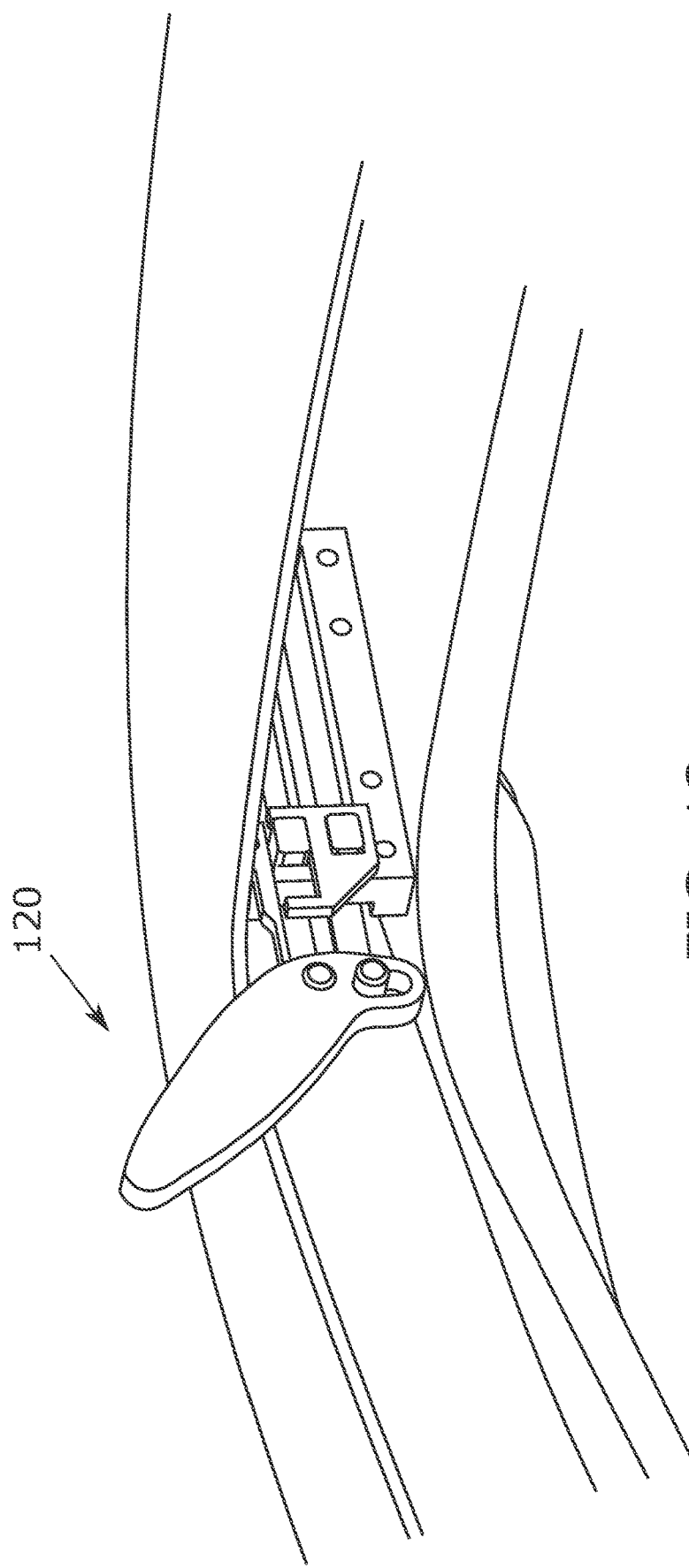
FIGS. 13 and 14 are perspective and partial sectional views of the vehicle roof and wind deflector assembly of FIG. 9.
Figure 14:
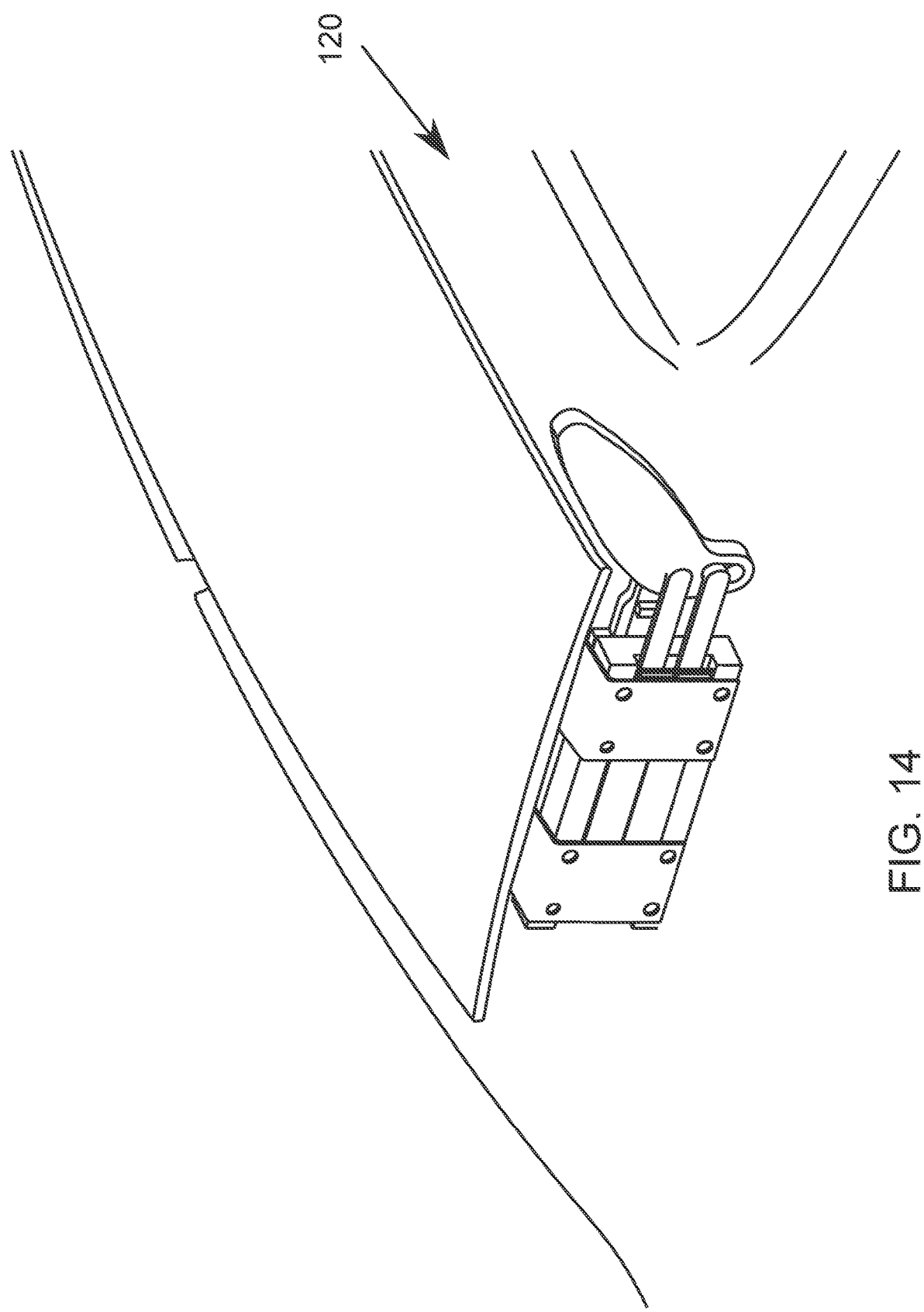

Optionally, and such as shown in FIGS. 9-14, a wind deflector assembly 120 may function in a similar manner as described above to move and pivot a wind deflector between a fully retracted state (FIG. 10) and a fully extended or opened state (FIG. 12). The wind deflector assembly may include a wind deflector similar to wind deflector 22 above, which is mounted at mounting arms 124 that are movable and pivotable relative to respective tracks 126 via a pair of linkages 132 that pivotally attach at the mounting arms and that linearly move along the tracks. As the linkages are moved outward along the track, the arms 124 pivot upward (FIG. 11) as they clear a stop element 125 at the end of the track until the arms are fully pivoted upward (FIG. 12) at the fully opened state.

Therefore, the wind deflector assembly provides a wind deflector that is disposed at an inner surface of a glass roof of a vehicle at or near an opening in the glass roof where a sunroof is disposed when closed. When the sunroof is opened, the wind deflector assembly functions to move a wind deflector partially into a leading region of the opening and to pivot the wind deflector upward to deflect wind and limit wind entering the roof opening as the vehicle is driven on a road. The wind deflector, when not in use, is fully retractable so as to be disposed at and below the inner surface of the roof panel and not in the opening. The wind deflector thus is translationally and pivotally movable between its fully retracted state, where the wind deflector is not at the opening and is not viewable by a person viewing the vehicle roof (due to an opaque frit layer or the like at the roof panel at least partially around the opening), and its fully extended state, where the wind deflector is moved rearward so as to be disposed at the opening in the roof and whereby the wind deflector pivots upwardly so as to protrude at least partially through the opening in the roof.

Figure 15:
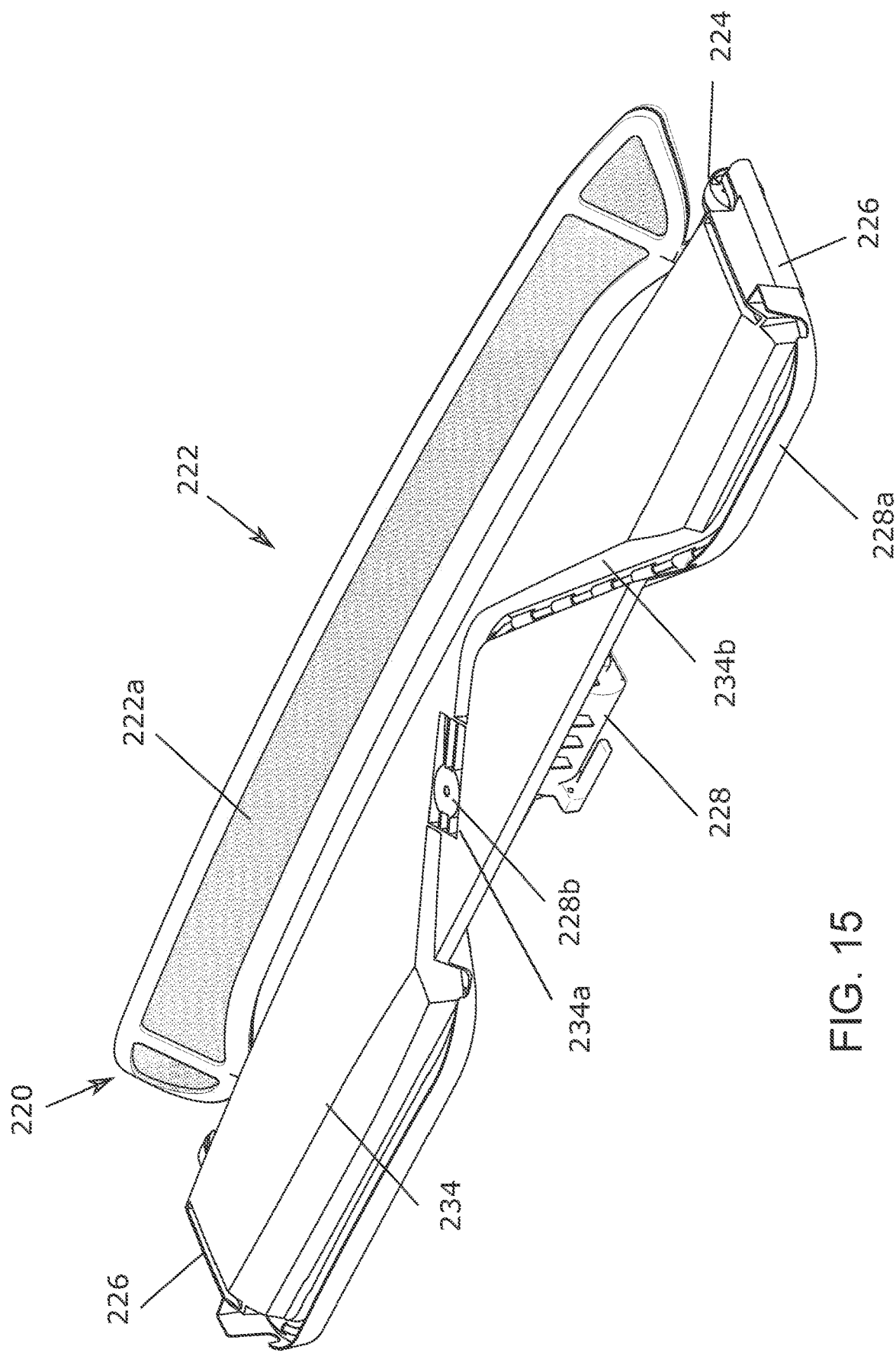
FIG. 15 is a perspective view of another wind deflector assembly of the present invention.

Optionally, the frame or support member and tracks may be part of a single construction that is mounted in the vehicle as a unit. Optionally, the support member may support the drive motor and may include guide recesses or elements that guide the cables between the drive motor and the tracks. For example, and such as shown in FIG. 15, the wind deflector assembly 220 includes a drive motor 228 that disposed at and mounted at a mounting structure of the frame 234, such as at or near a generally central region of the support member 234. The drive motor includes a drive gear or drive element 228*b* that is disposed at a receiving portion 234*a* of the support member 234, whereby the drive element 228*b* drives the cables 228*a* to move the mounting arms 224 and wind deflector 222 along the tracks or runners 226, such as by causing each cable to pull the respective mounting arm in one direction to retract the wind deflector and to push the respective mounting arm in the opposite direction to extend and raise the wind deflector (optionally, the cable may push to retract and pull to extend, depending on the cable and track and support member configuration). The drive motor rotatably drives the drive element 228*b*, which causes the push/pull movement of both cables 228*a* in the desired or appropriate direction to move the mounting arms relative to the respective tracks in tandem (so that one mounting arm does not move faster along its track than the other mounting arm moves along its track). The support member 234 includes cable guide recesses 234*b* that are formed or established along the support member 234 between the receiving portion 234*a* (at a generally central region of the frame 234) and respective ones of opposite end regions of the support member 234 at or near the tracks 226. The recesses receive the respective cable therein, and the frame may include guide elements or attaching elements that attach and/or guide and/or retain the respective cable at the respective recess 234*b*.

The wind deflector assembly 220 thus comprises a modular unit that can readily be installed at a vehicle roof opening, with the motor and cables retained at and along the frame or support member and with the tracks attached or formed at the opposite ends of the support member. The support member may comprise a molded plastic element (such as a plastic element formed via injection molding) with the tracks formed at the opposite end regions of the support member or formed separately and attached at the opposite end regions of the support member (such as via a snap attachment or via fasteners). The drive motor may attach (such as via a snap attachment or via fasteners) at the underside of the support member with its drive element disposed at the recess of the support member so as to engage the cables disposed along the cable guides of the support member. The wind deflector assembly may otherwise be similar to the wind deflector assemblies described above, such that a detailed discussion of the wind deflector assemblies need not be repeated herein.

Optionally, the fixed roof may comprise a transparent glass roof and the movable panel may comprise a transparent glass panel. Optionally, a ceramic frit layer or darkened layer or light absorbing layer or the like is disposed at the fixed window at locations where the wind deflector and/or sunroof channel portions or rails are attached at and at the movable panel where guide portions of the movable panel are attached, so that the wind deflector and channels and guides are not viewable from exterior of the vehicle by a person viewing the glass roof of the vehicle from above the roof. The glass roof and sunroof assembly may utilize aspects of the assemblies described in U.S. Publication No. 2008-0106124 and/or U.S. Pat. No. 9,475,370, which are hereby incorporated herein by reference in their entireties.

Optionally, the tracks or runners or channels or rails may be adhesively attached to the roof surface and the movable panel, respectively, such as by utilizing aspects of the window assemblies described in U.S. Pat. Nos. 5,551,197 and 5,853,895, which are hereby incorporated herein by reference in their entireties. For example, the rails may be bonded to the fixed glass roof panel using any suitable adhesive, such as a one component urethane adhesive, such as a moisture cured adhesive, such as BETASEAL™ or the like, while the frame portion may be bonded to the movable panel, such as a glass window panel or polycarbonate window panel or the like, via any suitable adhesive, such as a moisture cured adhesive, such as BETASEAL™ or the like.

Optionally, and desirably, the wind deflector is movable in response to actuation of a drive motor of a drive motor assembly or system, which may move cables or the like to impart horizontal movement of the movable panel along the rails. Optionally, the drive motor assembly may utilize aspects of the drive assemblies of the types described in U.S. Pat. Nos. 4,920,698; 4,995,195; 5,146,712; 5,531,046; 5,572,376; 6,119,401; 6,955,009 and/or 7,073,293, and/or U.S. Publication Nos. 2004-0020131 and/or 2008-0127563, which are all hereby incorporated herein by reference in their entireties. Optionally, the wind deflector may be operable responsive to a user input or may automatically extend/retract when the sunroof is opened/closed. If the wind deflector is operable responsive to a user input, an override feature would be included to prevent extension of the wind deflector when the sunroof is closed.

Changes and modifications to the specifically described embodiments may be carried out without departing from the principles of the present invention, which is intended to be limited only by the scope of the appended claims, as interpreted according to the principles of patent law.

The invention claimed is:

1. A wind deflector assembly for a roof of a vehicle, with the roof of the vehicle including a sunroof that is openable and closable relative to an aperture in the roof of the vehicle, said wind deflector assembly comprising:
   a wind deflector comprising a frame that circumscribes a screen;
   a pair of tracks disposed at an inner surface of the roof of the vehicle at or near the aperture;
   wherein said wind deflector is movably and pivotally mounted at said tracks via a pair of mounting arms;
   wherein said mounting arms are movable along said tracks and pivot relative to said tracks to pivot said frame and said wind deflector between a retracted position, where said wind deflector is disposed at the inner surface of the roof of the vehicle and between said tracks, and an extended position, where said wind deflector is disposed partially at the opening and is pivoted upward so as to protrude above an outer surface of the roof of the vehicle;
   wherein said mounting arms and said tracks are configured such that said mounting arms pivot between the retracted position and the extended position as said mounting arms are moved along said tracks;
   wherein each of said mounting arms includes a base portion and an arm portion extending from said base portion, and wherein opposite end portions of said frame of said wind deflector attach at said arm portions, and wherein said base portions are movably and pivotally disposed at said tracks;
   wherein each of said mounting arms includes a tab protruding radially from said base portion, and wherein said tab moves along a guide surface of the respective track and causes pivotal movement of said base portion and said mounting arm and said wind deflector to pivot said frame and said wind deflector between the retracted position and the extended position; and
   wherein each guide surface has an arcuate profile extending toward a cabin of the vehicle such that as said wind deflector moves from the retracted position toward the extended position, said tab moves along said arcuate profile toward the cabin of the vehicle and causes pivotal movement of said base portion and said mounting arm and said wind deflector.

2. The wind deflector assembly of claim 1, wherein said guide surface of each of said tracks narrows towards a rearward region of said track where said base portion is located when said wind deflector is in its extended position.

3. The wind deflector assembly of claim 1, wherein, when said wind deflector is in its extended position, said tab and said track limit downward pivotal movement of said wind deflector.

4. The wind deflector assembly of claim 1, wherein said mounting arms are movable along said tracks via a drive motor and cable assembly that is operable to pull a base portion of said mounting arms along said track.

5. The wind deflector assembly of claim 4, wherein said drive motor and cable assembly operate to pull said base portion of said mounting arms along said tracks in one direction and to push said base portion of said mounting arms along said tracks in an opposite direction.

6. The wind deflector assembly of claim 1, wherein said tracks are established at opposite end regions of a support member that spans between said tracks.

7. The wind deflector assembly of claim 6, wherein said mounting arms are movable along said tracks via a drive motor and cable assembly that is operable to move a base portion of said mounting arms in either direction along said track.

8. The wind deflector assembly of claim 1, wherein said arm portion of each of said mounting arms extends radially outward from the respective base portion in a first direction, and wherein said tab of each of said mounting arms extends radially outward from the respective base portion in a second direction that is different than the first direction.

9. The wind deflector assembly of claim 8, wherein the first and second directions define an angle therebetween, and wherein the angle remains constant as said base portions pivot to pivot said frame and said wind deflector between the retracted position and the extended position.

10. The wind deflector assembly of claim 1, comprising a biasing element disposed at each of said base portions to rotatably bias said mounting arms and said wind deflector toward the extended position.

11. The wind deflector assembly of claim 10, wherein said biasing element comprises a torsional spring disposed at each of said base portions.

12. The wind deflector assembly of claim 10, wherein each said biasing element is disposed between the respective base portion and a respective runner guide that moves along the respective track.

13. The wind deflector assembly of claim 12, wherein each of said tracks includes an inner channel that receives the respective runner guide and facilitates linear movement of said runner guide relative to said inner channel.

14. The wind deflector assembly of claim 13, wherein each said inner channel limits rotation of the respective runner guide, and wherein each said base portion rotates relative to the respective runner guide as said tab moves along said arcuate profile toward the cabin of the vehicle as said mounting arm is moved along said track.

15. The wind deflector assembly of claim 1, wherein said base portion pivots about a pivot axis as said tab moves along said arcuate profile as said mounting arm is moved along said track, and wherein the pivot axis of said base portion moves linearly along said track as said mounting arm is moved along said track.

16. The wind deflector assembly of claim 1, wherein said guide surface is linear at an end of said track where said base portion is positioned when said mounting arms are in the retracted position, and wherein said guide surface has the arcuate profile at the opposite end of said track where said base portion is positioned when said mounting arms are in the extended position.

\* \* \* \* \*